UNITED STATES PATENT OFFICE.

EDUARD VON RITTERSHAUSEN, OF VIENNA, AUSTRIA-HUNGARY.

FILTERING MATERIAL.

SPECIFICATION forming part of Letters Patent No. 664,782, dated December 25, 1900.

Application filed August 29, 1900. Serial No. 28,471. (No specimens.)

*To all whom it may concern:*

Be it known that I, EDUARD VON RITTERSHAUSEN, a subject of the Emperor of Austria-Hungary, residing at Vienna, in the Province of Lower Austria and Empire of Austria-Hungary, have invented a new and useful Filtering Material, of which the following is a specification.

My invention relates to the manufacture of filtering materials consisting of porous artificial silicates; and it has for its object to provide a filtering material of this class which can with certainty be produced with any desired degree of porosity, even so as to be suitable for eliminating bacteria from liquids.

Hitherto decomposed or naturally-disintegrated stones of the older formations have been used for manufacturing such silicates, or granules of ground quartz were cemented together by means of silicates, and consequently impervious portions were often found in the slabs or hollow bodies thus prepared. Now according to this invention an undecomposed stone—viz., syenite—is employed. This is ground to a fine powder, which is moistened with water and compressed in iron or other suitable molds. The resulting slabs or hollow bodies (candles) are baked at a temperature of from 1,000° to 1,200° Celsius, and the particles are thus caused to adhere superficially.

Owing to the chemical nature of the syenite coherent bodies can be obtained by the baking operation without the addition of a cement, and the porosity of the product is due to the fact that the fracture of the mineral is hackly and that consequently the particles obtained by grinding have sharp edges.

What I claim as my invention, and desire to secure by Letters Patent, is—

A filtering material in the form of slabs or hollow bodies (candles), composed of particles of syenite that have been caused to adhere together superficially by baking, substantially as described.

In witness whereof I have signed this specification in presence of two witnesses.

EDUARD VON RITTERSHAUSEN.

Witnesses:
   VICTOR KEUFEL,
   ALVESTO S. HOGUE.